United States Patent [19]
Yagasaki

[11] Patent Number: 6,125,353
[45] Date of Patent: Sep. 26, 2000

[54] MALL SERVER WITH PRODUCT SEARCH CAPABILITY

[75] Inventor: Isao Yagasaki, Kawasaki, Japan

[73] Assignee: Fujitsu Limited, Kawasaki, Japan

[21] Appl. No.: 08/917,202

[22] Filed: Aug. 25, 1997

[30] Foreign Application Priority Data

Mar. 17, 1919 [JP] Japan ..................................... 9-062854

[51] Int. Cl.[7] .................................................. G06F 17/60
[52] U.S. Cl. ........................................... 705/27; 707/104
[58] Field of Search ......................... 705/26, 27; 707/104

[56] References Cited

U.S. PATENT DOCUMENTS

| | | | |
|---|---|---|---|
| 4,992,940 | 2/1991 | Dworkin ................................... | 705/26 |
| 5,231,566 | 7/1993 | Blutinger et al. .................. | 364/479.03 |
| 5,513,117 | 4/1996 | Small ....................................... | 705/27 |
| 5,710,887 | 1/1998 | Chlliah et al. ............................ | 705/26 |
| 5,799,285 | 8/1998 | Klingman .................................. | 705/26 |

*Primary Examiner*—Emanuel Todd Voeltz
*Assistant Examiner*—Thomas A. Dixon

*Attorney, Agent, or Firm*—Staas & Halsey

[57] ABSTRACT

A mall server with a product search function, in which each product category has a particular effective period during which it is presented to customers as a selectable search key. In a virtual shopping mall system, customers can conduct a search for a set of products by designating a particular product category as a search key. As part of a mall server, a category master table stores a plurality of product categories accompanied by information on their respective effective periods, and a product master table stores information on various online products along with their respective category definitions. Based on the category master table, a product search screen generation unit produces product search screen data containing a set of categories whose effective periods include the present date. Receiving the product search screen data from the mall server, the customer terminal displays a product search screen including a category selection menu to provide the customer with a list of selectable categories. The customer issues a search request after selecting one category from the list. A product searching unit searches the product master table for the products that fall under the selected category. The customer terminal displays a product list screen upon receipt of the product list screen data from the mall server.

6 Claims, 10 Drawing Sheets

| STORE CODE | STORE NAME |
|---|---|
| IDM0001 | STORE A |
| IDM0002 | STORE B |
| IDM0003 | STORE C |

FIG. 4

| CATEGORY CODE | CATEGORY NAME | STARTING DATE CODE | ENDING DATE CODE |
|---|---|---|---|
| J0001 | HOLIDAY SEASON | 12/01 | 12/25 |
| J0002 | MOTHER'S DAY | 04/11 | 05/11 |
| J0003 | FATHER'S DAY | 05/15 | 06/15 |
| J0004 | ST. VALENTINE'S DAY | 02/01 | 02/14 |
| C0001 | FOOD & DRINK | 00/00 | 99/99 |
| C0002 | FASHION | 00/00 | 99/99 |
| C0003 | ELECTRICAL APPLIANCE & PERSONAL COMPUTER | 00/00 | 99/99 |
| C0004 | OFFICE FURNITURE & STATIONERY | 00/00 | 99/99 |
| C0005 | EDUCATION | 00/00 | 99/99 |
| C0006 | BOOKS | 00/00 | 99/99 |

FIG. 5

| PRODUCT CODE | PRODUCT NAME | UNIT PRICE | PRODUCT DESCRIPTION URL | STORE CODE | CATEGORY CODE #1 | CATEGORY CODE #2 |
|---|---|---|---|---|---|---|
| A0001 | PRODUCT #1 | $20.80 | /IDM0001/A01.html | IDM0001 | C0001 | J0001 |
| A0002 | PRODUCT #2 | $20.80 | /IDM0001/A02.html | IDM0001 | C0003 | J0001 |
| A0003 | PRODUCT #3 | $83.30 | /IDM0001/A03.html | IDM0001 | C0002 | J0001 |
| A0004 | PRODUCT #4 | $27.80 | /IDM0001/A04.html | IDM0001 | C0004 | J0001 |
| A0005 | PRODUCT #5 | $31.25 | /IDM0001/A05.html | IDM0001 | C0003 | J0001 |
| A0006 | PRODUCT #6 | $41.67 | /IDM0001/A06.html | IDM0001 | C0002 | J0002 |
| A0007 | PRODUCT #7 | $13.90 | /IDM0001/A07.html | IDM0001 | C0002 | J0002 |
| B·1 | PRODUCT #8 | $69.50 | /IDM0002/B·1.html | IDM0002 | C0005 | J0001 |
| B·2 | PRODUCT #9 | $30.30 | /IDM0002/B·2.html | IDM0002 | C0006 | J0002 |

FIG. 6

```
┌─────────────────────────────────────┐
│                                     │
│   PLEASE SELECT A CATEGORY.         │
│                                     │
│        ● FASHION                    │
│                                     │
│        ○ GOURMET                    │
│                                     │
│        ○ HOBBY                      │
│                                     │
│        ○ HOLIDAY SEASON             │
│                                     │
│        ○ MOTHER'S DAY               │
│                                     │
└─────────────────────────────────────┘
```
60

PRIOR ART

FIG. 10

MALL SERVER WITH PRODUCT SEARCH CAPABILITY

BACKGROUND OF THE INVENTION

1. Field of the Invention

The present invention relates to a mall server which provides a virtual shopping mall on a network, and more particularly, to a mall server which classifies online products into a plurality of categories to help consumers to search for the desired products.

2. Description of the Related Art

The recent advancement in data communications technologies have allowed general consumers to enjoy various services over a wide area network such as the Internet. The network-based virtual shopping mall is one of such new services realized by applying today's latest network technologies. In actuality, consumers can purchase a variety of products by making access to their favorite online shopping malls from home, without making a trip to any "physical" stores.

Functions of such a virtual shopping mall are provided by a server computer called a mall server. When a customer make access to this mall server through the Internet, a list of the products sold in the shopping mall will be first presented to him/her. To aid him/her to find the desired products, the mall server offers product search functions, where product categories can be specified as search keys.

FIG. 10 shows a typical product search screen provided by a conventional mall server. This product search screen 60, when opened by a customer, presents a list of product categories, where several categories such as "Fashion," "Gourmet," "Hobby," "Holiday Season," and "Gifts" are listed as available search keys. From this list, the customer selects one category that may include what he/she desires to buy. Products that fall under the selected category are then displayed on the screen of customer's terminal. The customer browses them and places a purchase order of the desired product, if any, by simply clicking an item displayed on the screen.

As described above, the product search function with a category search capability is a powerful tool for the customers to find and order the desired products over the network.

However, conventional category search functions show all categories registered therein, regardless of the seasons. Accordingly, they sometimes supply the customers with some inappropriate categories which are apparently out of season, and such unnecessary categories disturb the customer's selection of target categories. Take the category of "Holiday Season" for instance. This is a typical category having a seasonal nature; i.e., the consumer's demands specific to this category are concentrated within a few weeks before Christmas Day.

As explained above, conventional search screens show any seasonal categories possibly including invalid ones, the presence of which makes other valid categories less distinguishable. This results in difficulty for the customers to find the desired category.

Further, the merchants participating in a virtual shopping mall are responsible to maintain their product databases so that no out-of-season products be presented in the search results, since such information will only throw the customers into confusion. Such database maintenance requires timely registration of new products and immediate deletion of old products in accordance with the turning of the seasons, thus imposing heavy workloads to those who operate the virtual stores.

SUMMARY OF THE INVENTION

Taking the above into consideration, an object of the present invention is to provide a mall server which controls a product search screen so that a seasonal category be listed as a search key only within a limited effective period.

To accomplish the above object, according to the present invention, there is provided a mall server which classifies products into a plurality of categories to allow a customer to search for a desired product. This mall server comprises: a category master table in which the plurality of categories are registered, each category being accompanied by information on an effective period thereof; a product master table where the products classified into the categories are registered; product search screen creation means, responsive to a search screen request from a customer terminal, for creating product search screen data containing a category selection menu which is a list of the categories whose effective periods include a present date as a term of validity; and product searching means, responsive to a search command from the terminal used to browse the product search screen data, for searching the product master table for the products belonging to one category selected from among the list of the categories of the category selection menu.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4 is a diagram showing an example of a store master table;

FIG. 5 is a diagram showing an example of a category master table;

FIG. 6 is a diagram showing an example of a product master table;

FIG. 10 is a diagram showing a product search screen provided by a conventional mall server.

DESCRIPTION OF THE PREFERRED EMBODIMENTS

An embodiment of the present invention will be described below with reference to the accompanying drawings.

Figure 1:
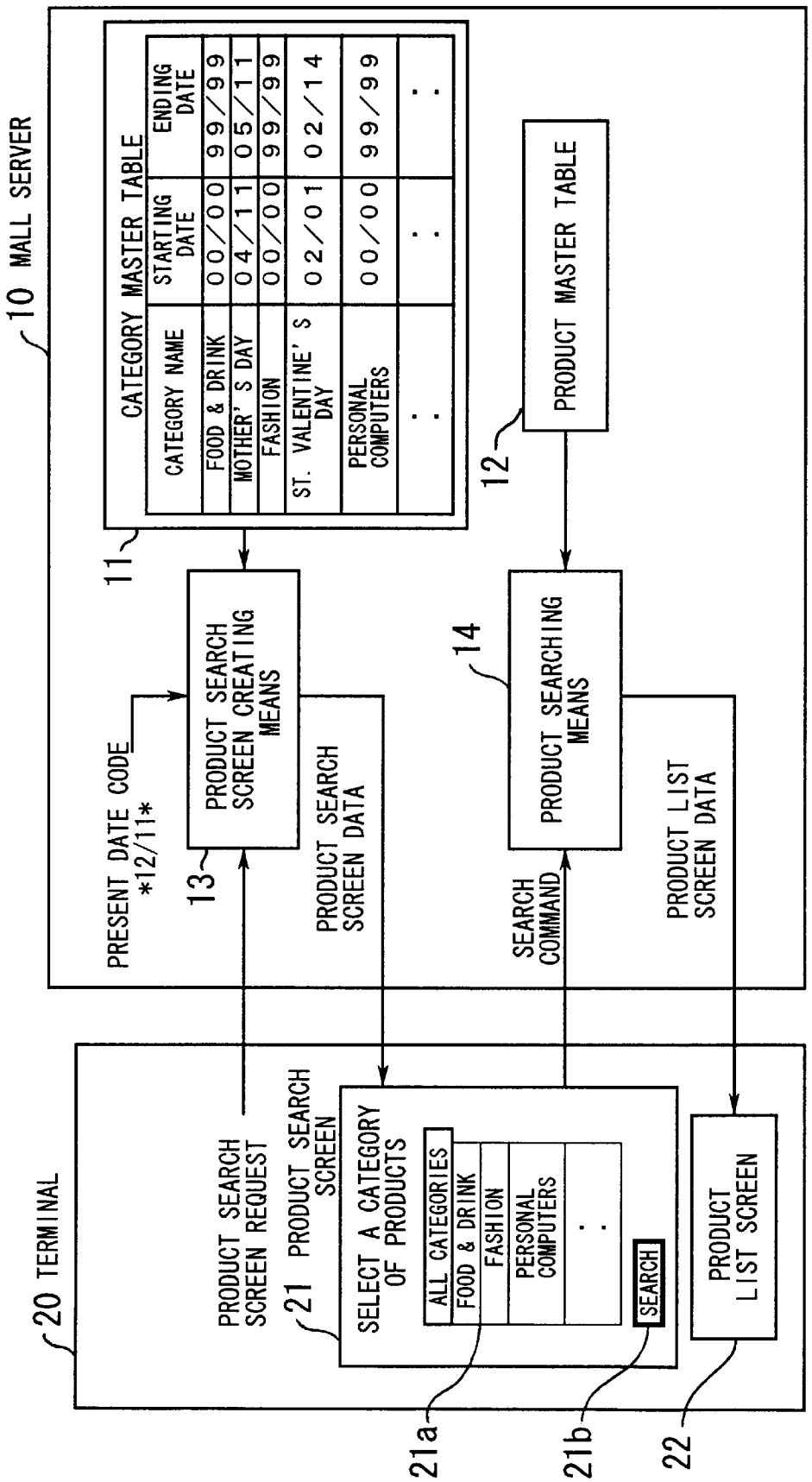
FIG. 1 is a conceptual view of the present invention.

FIG. 1 shows a conceptual view of the present invention. A customer makes access to a mall server 10 through a terminal 20. The mall server 10 provides the customer with a category-based search function that helps him/her to find a product from among those offered by the stores participating in this virtual shopping mall.

To control the product search function, the mall server 10 has two kinds of tables, a category master table 11 and a product master table 12. The category master table 11 stores information on a plurality of product categories to be used as search keys. In this table 11, each category is associated with information on its effective period, which is defined as a set of two date codes representing the starting date and ending date. The product master table 12, on the other hand, stores such data that associates individual products with the categories that they belong to.

Upon receipt of a search screen request issued from the terminal 20, the product search screen creating means 13 creates product search screen data, based on the category master table 11. This product search screen data describes how to construct a category selection menu, i.e., a list of product categories whose predefined effective periods include the present day. The product search screen data created as such is sent to the terminal 20.

The product searching means 14 accepts a search command with a category designation from the terminal 20, and referring to the product master table 12, it conducts a search for the products that fall under the designated category. When any relevant products are found, the product searching means 14 creates product list screen data and sends it to the terminal 20.

As a client of the mall server 10, the terminal 20 submits a search screen request to obtain product search screen data therefrom, as well as issuing a search command to invoke a search. The terminal 20 also has a function to aid customers to browse the data sent from the mall server 10. More specifically, the terminal 20 displays a product search screen 21 upon receipt of product search screen data, while displaying a product list screen 22 upon receipt of product list screen data.

A customer, attempting to search for a certain product in the above-described system, sends a search screen request to the mall server 10 through the terminal 20. Upon receipt of the request, the product search screen creating means 13 generates product search screen data and sends it back to the terminal 20. Based on this data, the terminal 20 displays the product search screen 21 including a category selection menu 21a. This menu 21a, however, excludes such categories that are not suitable for the present time of the year.

In FIG. 1, the category titled "Mother's Day" has the starting date code "04/11" and ending date code "05/11," and the category "St. Valentine's Day" has the starting date code "02/01" and ending date code "02/14." Because the present date code is "12/11" (i.e., December 11), the above two categories are excluded from the category selection menu 21a as being unsuitable for the present season. Accordingly, the customer chooses one category from among the displayed categories which are assured to suit the present season. The customer then presses a "Search" button 21b, thereby submitting a search command toward the mall server 10. When this search command reaches the mall server 10, the product searching means 14 executes a search for the products that fall under the selected category to create product list screen data. The created product list screen data is supplied to the terminal 20 and presented to the customer as a product list screen 22.

As described above, the category selection menu 21a contains only a qualified set of search key items that are applicable to the present season. Since invalid categories, which could make other necessary categories obscure, are automatically rejected, the customer can find the target category easily. As such, the mall server system of the present invention lightens the burden imposed on the customers in the product category selection, and of course, the product list offered to the customers never includes such products whose scheduled sales periods have not come yet or have already been expired.

Next, an embodiment of the present invention is explained below, with reference to a typical mall server of the present invention, where an online shopping environment is provided on the Internet.

Figure 2:
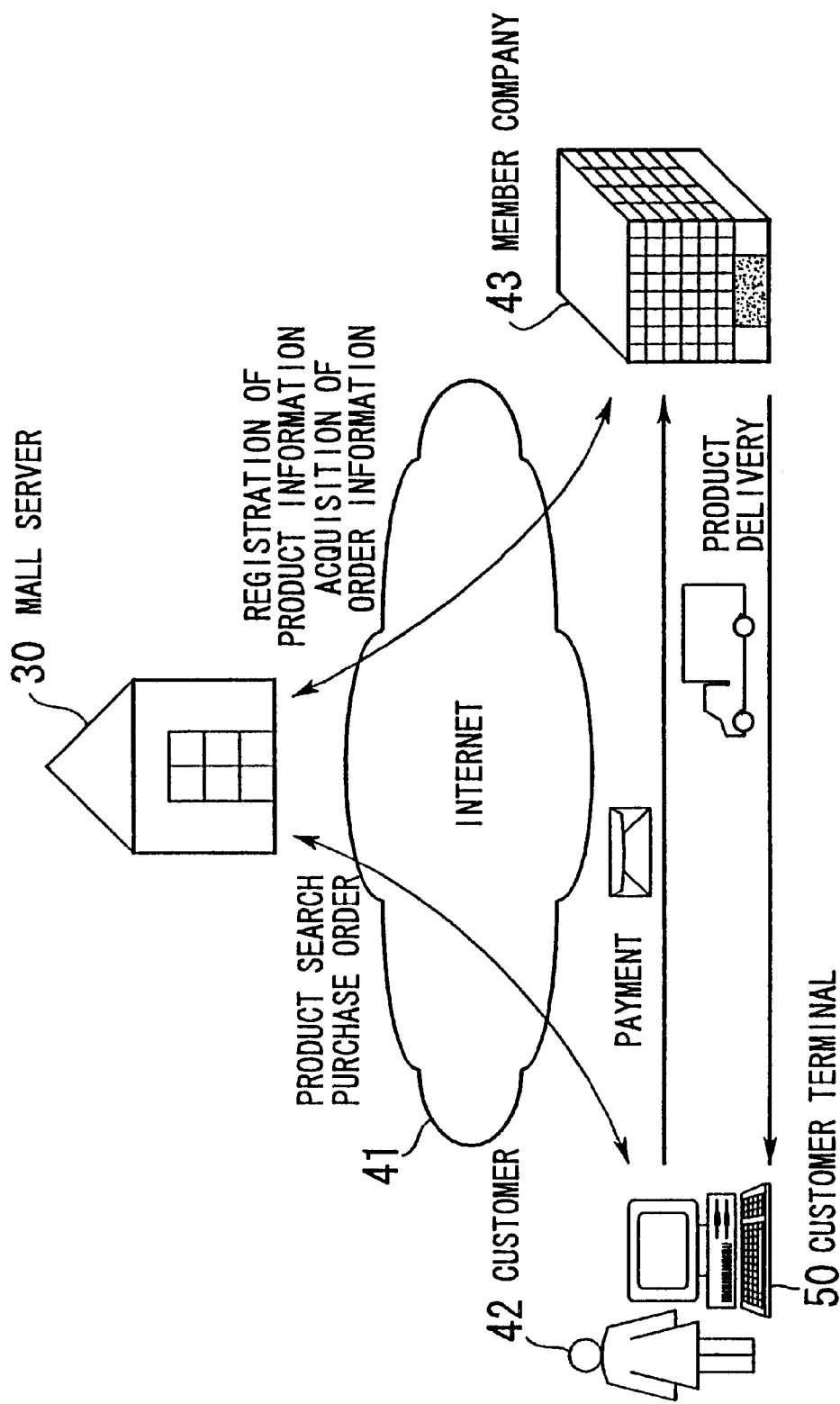
FIG. 2 is a diagram schematically showing a shopping mall system.

FIG. 2 schematically shows a proposed shopping mall system. A mall server 30 is linked to a customer terminal 50 at the site of a customer 42 as well as to a computer of a member company 43 via the Internet 41.

The customer 42 can make access to the mall server 30 by using the customer terminal 50 to make a search for a product and to place an order for the product. This purchase order from the customer is held in the mall server 30. A personnel of the member company 43 is assigned for management tasks of a virtual branch store established in the mall. He/she interacts with the mall server 30 to register information related to products and also to obtain order status information that indicates backlog of orders. When a customer sends an order to the mall server 30, the personnel of the mall server 30 learns it from the obtained order status information, and after confirming the payment from the customer, he/she ships the product to the customer.

Figure 3:
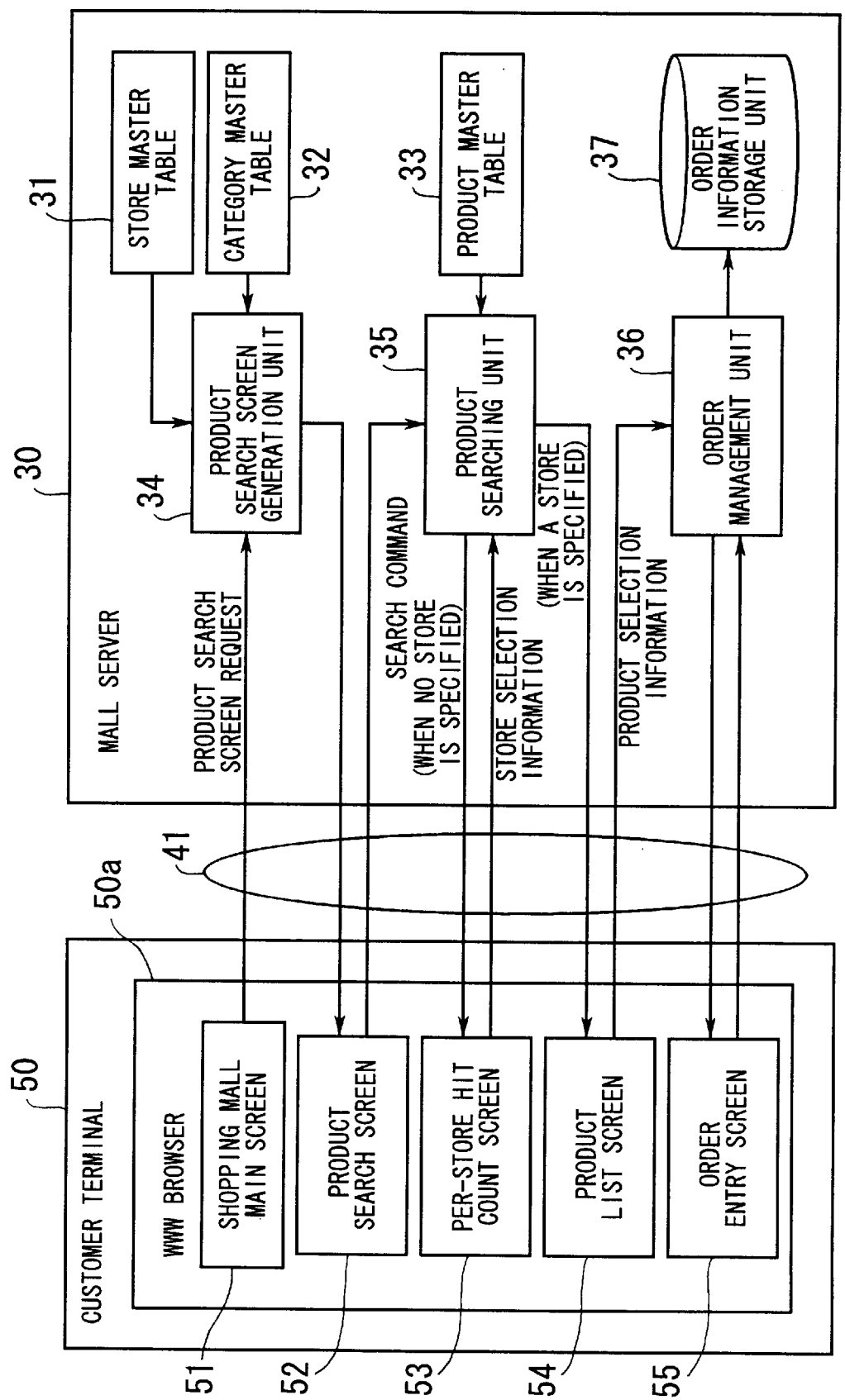
FIG. 3 is a diagram showing the internal structure of a mall server and a customer terminal.

FIG. 3 shows the internal structure of the mall server 30 and customer terminal 50. The screen data to be passed from the mall server 30 to the customer terminal 50, including product search screen data and the like, is formulated as document data written in the Hyper Text Markup Language (HTML) format.

The mall server 30 has the following tables for various information entry: (a) store master table 31 which stores information to identify the member companies participating in the mall, (b) category master table 32 which stores the effective period of each category, and (c) product master table 33 which stores categories to classify the products into. The contents of these tables are described later in detail.

The product search screen generation unit 34, in response to a search screen request from the customer terminal 50, generates product search screen data while referring to the store master table 31 and category master table 32. The generated product search screen data is sent to the customer terminal 50. When a search command is given from the customer terminal 50, the product searching unit 35 searches the product master table 33 according to the search condition specified in the command. If no particular store is specified in the search condition, the product searching unit 35 creates hit count screen data on a store-by-store basis and sends it to the customer terminal 50. In turn, if any particular store is specified, the product searching unit 35 prepares for product list screen data and sends it to the customer terminal 50.

The order management unit 36 receives product selection information from the customer terminal 50 and responds to it by returns order entry screen data for the selected product. When data items necessary for the order entry are provided through the customer terminal 50, the order management unit 36 stores them into the order information storage unit 37 as a record of order information.

On the other hand, the customer terminal 50 has a World Wide Web (WWW) browser 50a to allow the customer to read HTML documents. Each screen data received from the mall server 30 is supplied to this WWW browser 50a and displayed on the monitor screen of the customer terminal 50. The WWW browser 50a is also used as a front end device or the customer to interact with the mall server 30, allowing various requests and commands are entered thereto.

More specifically, when trying to purchase a certain product online, the customer accesses the mall server 30 by using the WWW browser 50a so that a shopping mall main screen 51 will appear on the monitor screen of the customer terminal 50. The customer can send a search screen request through this main screen.

In addition to this shopping mall main screen 51, WWW browser 50a displays a product search screen 52, a per-store hit count screen 53, a product list screen 54, and an order entry screen 55, based on the relevant information received from the mall server 30. The product search screen 52 is used by the customer to issue a search command with a particular store or product category specified for the search. The per-store hit count screen 53 is a screen that shows, on an individual store basis, the number of product items that meet the search condition. The product list screen 54 is a screen where the customer specifies which product to buy. The order entry screen 55 is an order form screen where the customer enters necessary data items to place an order for the product.

Next, the information contents registered in each table will be explained below.

FIG. 4 shows an example of the store master table 31. The store codes and store names are registered in the store master table 31, being associated with each other. The administrator of the mall server 30 conducts registration of those store codes and names. The store master table 31 illustrated in FIG. 4 contains the following three entries: a store code "IDM0001" corresponding to a store name "Store A," "IDM0002" corresponding to "Store B," and "IDM0003" corresponding to "Store C".

FIG. 5 shows an example of the category master table 32. This category master table 32 contains category names, starting date codes, and ending date codes each associated with separate category codes. The data contents of this category master table 32 are entered and maintained by the administrator of the mall server 30. With respect to the categories having no specific time restriction, their starting date codes and ending date codes are defined as "00/00" and "99/99," respectively, implying that they are applicable all through the year. In the example of FIG. 5, the categories "Food & Drink," "Fashion," "Electrical Appliances & Personal Computers," "Office Furniture & Stationery," "Education," and "Books" fall into this non-restricted group.

In contrast to this, some categories have specific period definitions such as the category "Holiday Season" which is valid within a period of "12/01–12/25" (i.e., from December 1 through December 25). Other such categories include the "Mother's Day" for "04/11–05/11," "Father's Day" for "05/15–06/15," and "St. Valentine's Day" for "02/01–02/14."

FIG. 6 shows an example of the product master table 33. The product master table 33 stores information on the online products, where each data entry is identified by a unique product code. More specifically, each product is defined by its product name, unit price, Uniform Resource Locator (URL) of product description screen, store code, first category code #1, and second category code #2. Store operators registers such data contents. In this example, one product can belong to a plurality of categories. For instance, the "Product #1" has two registered category codes "C0001" and "J0001," implying that this product belongs to two different categories, "Holiday Season" and "Food and Drink." The product description URL shows the address of an HTML document that describes the specification of each product.

Next, a process executed by the mall server 30 when the customer makes a product search will be explained in detail, assuming that the table data explained in FIGS. 4 to 6 are ready in the mall server 30 of FIG. 3.

Figure 7:
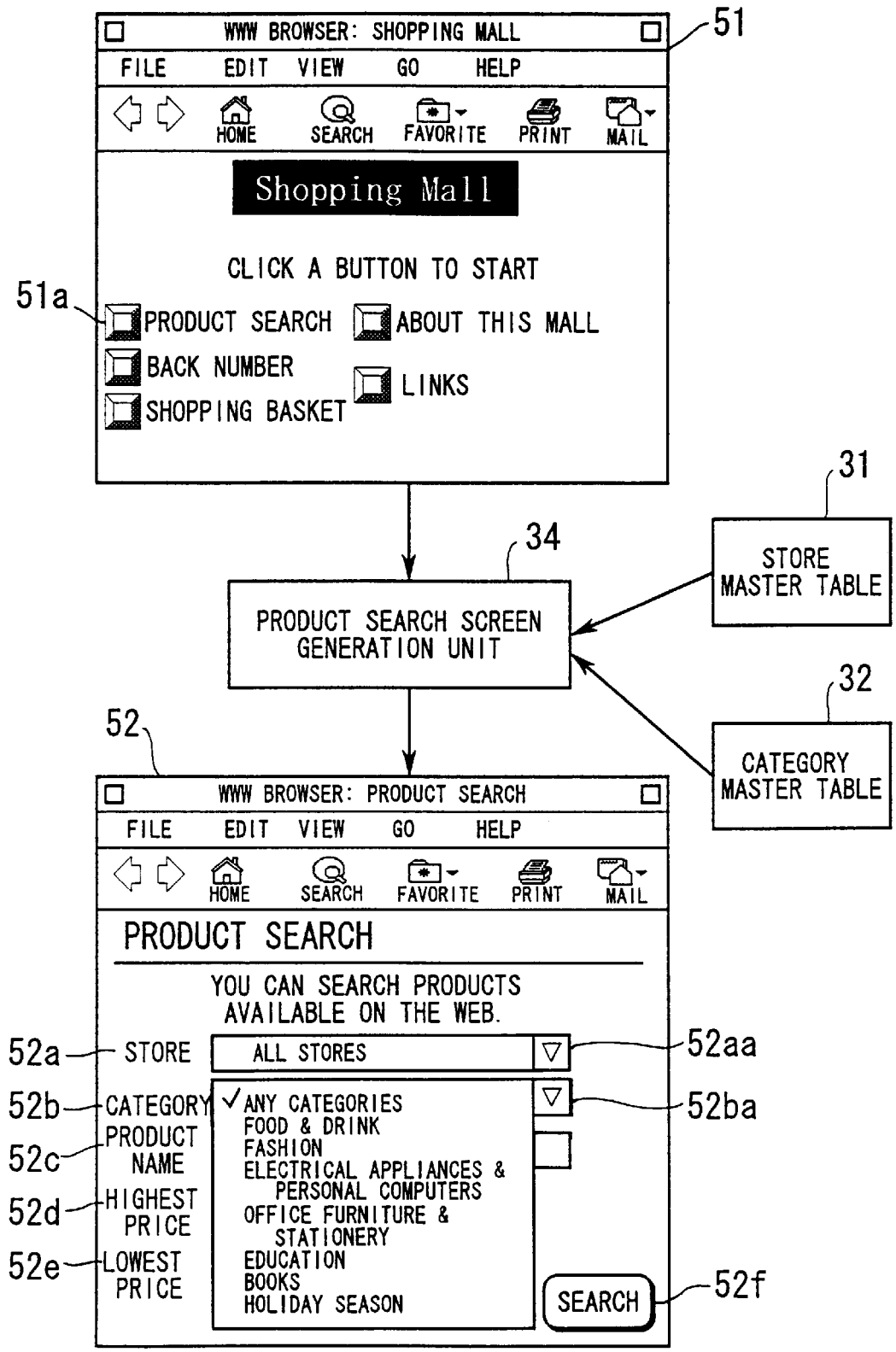
FIG. 7 is a diagram illustrating how the system generates a product search screen.

FIG. 7 illustrates how the system generates a product search screen. The shopping mall main screen 51 shows several service items that the shopping mall provides to the customer. "Product Search" is one of such items, and a click on this "Product Search" button 51a will direct the customer terminal 50 to send a search screen request to the mall server 30 (see FIG. 3). Then, the product search screen generation unit 34 acquires the names of the registered stores from the store master table 31. Further, it obtains, from the category master table 32, the names of the categories whose effective periods include the present date. The product search screen generation unit 34 creates product search screen data based on the above information.

With the product search screen data sent from the product search screen generation unit 34, the customer terminal 50 (see FIG. 3) displays a product search screen 52 on its monitor. This product search screen 52 provides input boxes 52a to 52e for the customer to enter the search keys, while, in FIG. 7, the input boxes 52c to 52e are hidden behind the drop down list of the input box 52b. In this example, the product search screen 52 shows the following five different search key types: "Store," "Category," "Product Name," "Highest Price," and "Lowest Price." The search key input boxes 52a and 52b, titled "Store" and "Category," have arrow buttons 52aa and 52ba on the right-hand side to call up a list of selectable items.

When the customer presses the arrow button 52aa at the right of the "Store" input box 52a, the drop down list will appear to show all store names registered in the store master table 31 of FIG. 4. Here, assume that the present date is "December 11," for example. When the customer presses the "Category" arrow button 52ba, the product search screen generation unit 34 searches the category master table 32 shown in FIG. 5 to find every category whose effective period definition (i.e., the start and ending date codes) covers the present date. The found categories are displayed in a drop down list as shown in FIG. 7. Note that none of "Mother's Day," "Father's Day," and "St. Valentine's Day" shown in the category master table 32 is displayed in this drop down list, since they are not suitable for the present season.

In the product search screen 52, the customer chooses one category that may include the desired product, which information is to be used as a search key. The customer then presses the "Search" button 52f. This action causes a search command to be transmitted from the customer terminal 50 (see FIG. 3) to the mall server 30 (see FIG. 3). The search command, when accepted by the mall server 30, is passed to the product searching unit 35 and the search of the product is conducted.

Figure 8:
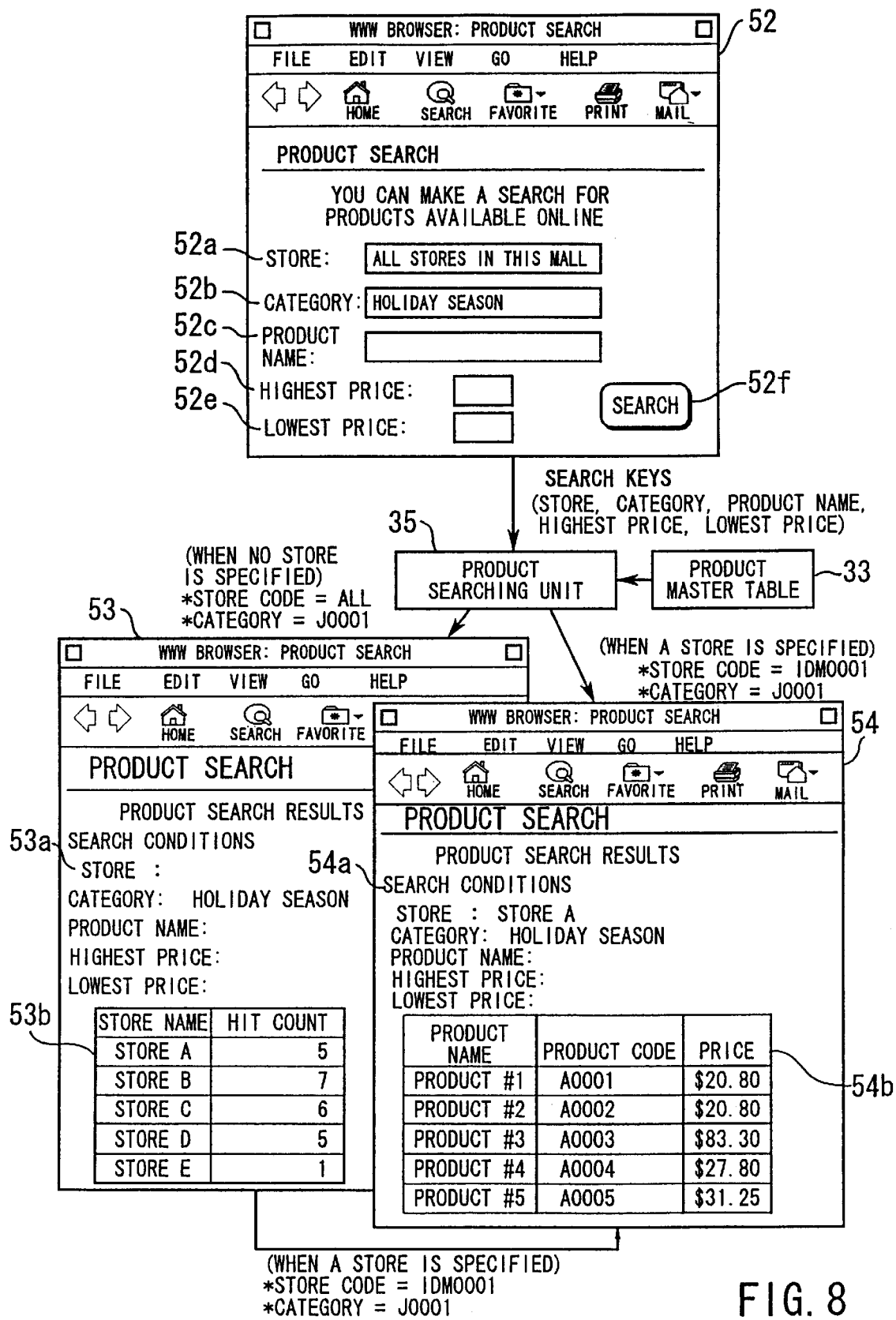
FIG. 8 is a diagram illustrating how the system executes a product search.

FIG. 8 illustrates how the system executes the above-described product search process. When the customer enters various search keys and presses the "Search" button 52f in the product search screen 52, the entered search keys are supplied to the product searching unit 35. Then, the product searching unit 35 conducts a product search while referring to the product master table 33.

In the case that no particular store is specified as a search key, the product searching unit 35 retrieves every product having the specified category code as defined in the product master table 33 and calculates the number of hits separately for each store code. Further, the product searching unit 35 creates per-store hit count screen data from the above search results. Based on this data, a per-store hit count screen 53 is displayed on the monitor screen of the customer terminal 50 (see FIG. 3).

On the other hand, in the case that a particular store is specified by the customer, the product searching unit 35 extracts from the product master table 33 every product having both of the specified category and the specified store codes. The product searching unit 35 further creates product list screen data from this search result and directs the customer terminal 50 (see FIG. 3) to display a product list screen 54.

The per-store hit count screen 53 has a search condition display area 53a and the per-store hit count display area 53b. In the example screenshot, the item "Category" as part of the search condition display area 53a shows only one category, "Holiday Season." On the other hand, the number of products that meet the given search condition are counted on a per-store basis and listed in the "Hit Count" column of the per-store hit count display area 53b. In FIG. 8, the hit counts concerning the products having the category code "J0001" (i.e., "Holiday Season" category) are summarized in table form, enumerating five stores A to E. After looking through this per-store hit count display area 53b, the customer selects one store from among those listed therein. Suppose that he/she chose the "Store A." The monitor screen of the customer terminal 50 (see FIG. 3) is then switched to a product list screen 54 prepared for the selected "Store A."

The product list screen 54 includes a search condition display area 54a and a product list display area 54b. In the search condition display area 54a illustrated in FIG. 8, the store name "Store A" is shown as the entry for the first search condition "Store," while the category name "Holiday Season" is specified as the second search condition "Category." The product list display area 54b summarizes the searched products by listing the "Product Names" along with their respective "Product codes" and "Prices." When the customer takes his/her choice from among the products listed in the display area 54b, this product selection information is sent to the order management unit 36 (see FIG. 3). As a result, an order entry screen 55 pops up on the monitor screen of the customer terminal 50 (see FIG. 3). The customer can place an order for the product of his/her choice by filling out an online order form through this order entry screen 55. The order information entered as such is sent to the mall server 30 (see FIG. 3) and stored in the order information storage unit 37 (see FIG. 3) under the control of the order management unit 36 (see FIG. 3).

Next, a process of generating a product search screen will be explained in detail below. This process is executed by the aforementioned product search screen generation unit 34 in response to a search screen request.

Figure 9:
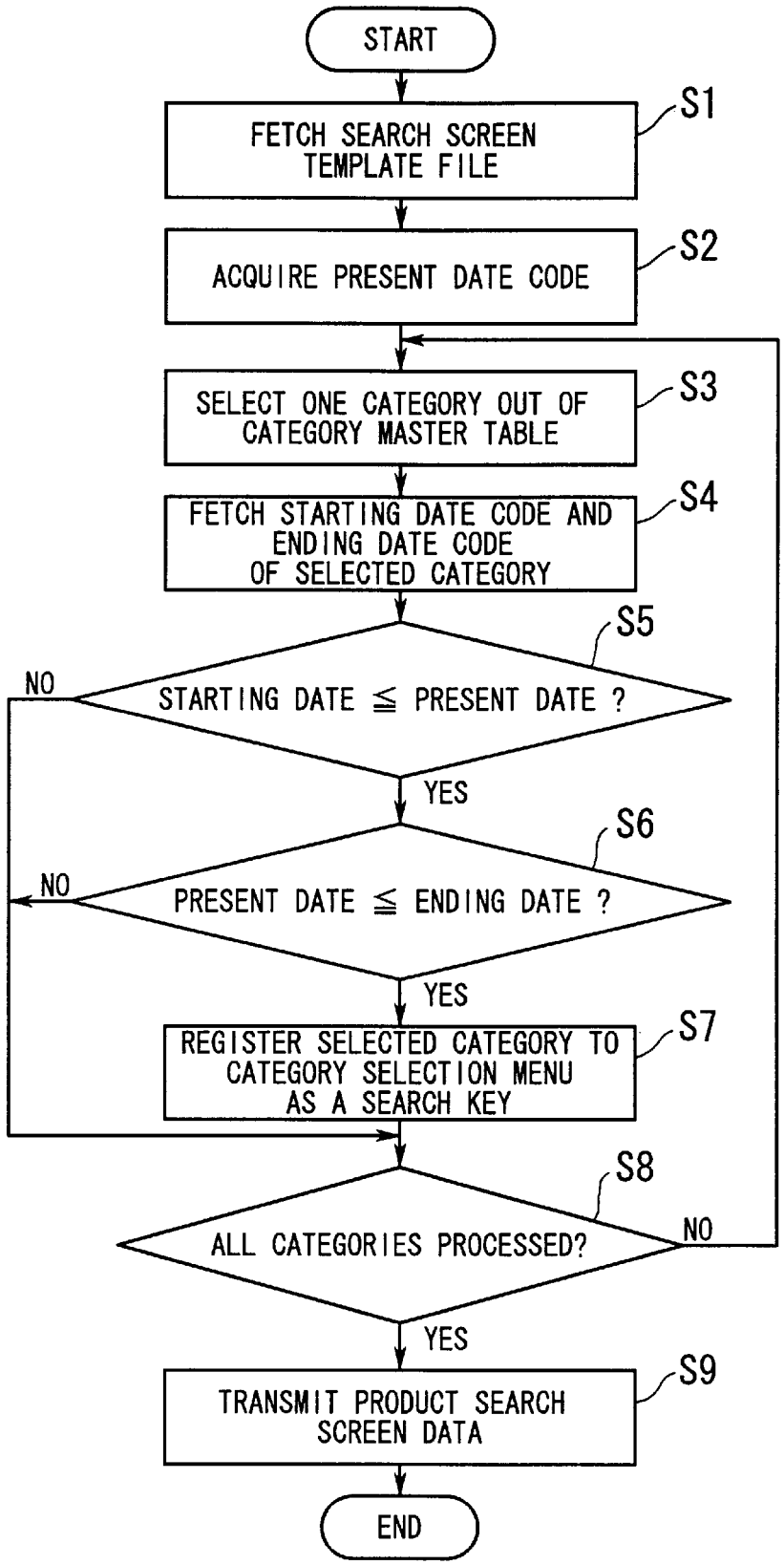
FIG. 9 is a flowchart showing a process executed by a product search screen generation unit.

FIG. 9 is a flowchart showing the product search screen generation process, whose details are explained below according to the sequence of step numbers shown therein.

[S1] The product search screen generation unit 34 (see FIG. 7) first fetches a search screen template file. This template file is a document template in the HTML format prepared beforehand for the purpose of search screen generation, in which a list of available stores is fully defined but data fields for a category selection menu are left blank.

[S2] The product search screen generation unit 34 acquires the present date code by using a calendar clock function integrated in the mall server 30 (see FIG. 3).

[S3] Out of the category master table 32 (see FIG. 7), the product search screen generation unit 34 (see FIG. 7) selects one category that has not been processed.

[S4] The product search screen generation unit 34 (see FIG. 7) fetches the starting date code and the ending date code of the selected category.

[S5] Comparing the present date code with the starting date code, the product search screen generation unit 34 (see FIG. 7) determines whether it is before the scheduled starting date or not. The process advances to step S6 if the present date is the exact starting date or after the starting date. Otherwise, the process skips to step S8.

[S6] Comparing the present date code with the ending date code, the product search screen generation unit 34 determines whether it is before the scheduled ending date or not. The process advances to step S7 if the present date is the exact ending date or before the ending date. Otherwise, the process skips to step S8.

[S7] The product search screen generation unit 34 enters the selected category to the category selection menu as one of selectable search keys. For instance, the selected category accompanied by a tag <OPTION> is inserted into an area between HTML tags <SELECT> and </SELECT>.

[S8] It is examined whether all categories have been processed or not. The process advances to step S9 if all the categories have been processed, while it returns to step S3 if any category remains unprocessed.

[S9] The product search screen generation unit 34 transmits the produced product search screen data to the customer terminal 50.

In the way described above, the product categories that match with the present season are selectively registered in the category selection menu as the proposed search keys. Since the categories that do not suit the season will never be presented to the customer, he/she can easily choose a target category and use it as a search key.

Further, in the present invention, the mall server manages the effective periods on an individual category basis. Therefore, each member company can reduce their workloads necessary for updating their databases for registration and deletion of seasonal product entries. Further, since the system does not require any administrative work other than the registration of starting dates and ending dates to the category master table, the operator's workload to maintain the mall server is also reduced.

The above discussion is summarized as follows. According to the present invention, the effective period of each category is previously registered in a category master table, and in response to a search screen request from a customer terminal, the mall server creates product search screen data to enable the terminal to present a product search screen to the customer. A category selection menu, as part of this product search screen, contains only a qualified set of categories whose effective periods suit the present date code. By browsing this product search screen, the customer can easily select the desired category from among those that suit the season.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mall server comprising:
    a category master table indexing a plurality of categories, each category being accompanied by information on an effective period thereof;

a product master table cross-referencing products to categories, having at least two category columns for storing a first category code and a second category code so as to allow each product to have two different categories;

product search screen creation means, responsive to a search screen request from a customer terminal, for creating product search screen data including a category selection menu listing categories having effective periods which include a present date; and product searching means, responsive to a search command from the customer terminal, for searching said product master table for the products belonging to a category selected from the list of the categories of the category selection menu.

2. The mall server according to claim 1, wherein the effective period of each category is defined by a starting date and an ending date.

3. The mall server according to claim 1, wherein said product search screen creation means creates the product search screen data as a structured document in a format readable by an Internet Browser.

4. The mall server according to claim 1, wherein said product searching means, in response to the search command, determines whether a particular store is specified, and, if no particular store is specified in a search condition, creates a per-store hit count screen data by counting the number of products that suit the search condition on an individual store basis.

5. A computer readable medium encoded with software causing a computer to perform the following actions:

maintaining a table of products offered for sale via an electronic store front including fields containing an indication of each product's name and at least two categories of the product;

maintaining a table of categories including fields containing an indication of each category name and an effective period of time for which the category is to be available to shoppers; and upon a request from a shopper for a list of available categories, forming the list by searching the table of categories to find categories having an effective period of time containing the date upon which the request was made.

6. A method of presenting products to customers in a virtual shopping mall comprising:

creating a table of products offered for sale via an electronic store front including fields containing an indication of each product's name and at least two categories of the product;

creating a table of categories including fields containing an indication of each category name and an effective period of time for which the category is to be available to shoppers;

upon a request from a shopper for a list of available categories, forming the list by searching the table of categories to find categories having an effective period of time containing the date upon which the request was made;

displaying the list of categories to the customer;

upon the selection of a category, displaying the products from the table of products having the selected category.

* * * * *